United States Patent [19]

Blasbalg

[11] 4,327,669
[45] May 4, 1982

[54] MULTIPLE BIRD FEEDER

[76] Inventor: Morton Blasbalg, 26 Sandro Dr., Warwick, R.I. 02886

[21] Appl. No.: 125,366

[22] Filed: Feb. 28, 1980

[51] Int. Cl.³ ............................................. A01K 39/01
[52] U.S. Cl. .................................................. 119/51 R
[58] Field of Search ............................ 119/51 R, 52 R

[56] References Cited

U.S. PATENT DOCUMENTS

| | | | |
|---|---|---|---|
| 3,316,884 | 5/1967 | Viggars | 119/51 R X |
| 3,568,641 | 3/1971 | Kilham | 119/51 R |
| 4,207,839 | 6/1980 | Barry | 119/51 R |

Primary Examiner—Hugh R. Chamblee

[57] ABSTRACT

A multiple bird feeder comprising three elongated hollow cylindrical bodies of a clear transparent plastic material. The cylinders are grouped in contiguous relation and held in position at the top and bottom. An annular dished member is provided with three integral socket portions, the bottom ends of the cylinders setting into the socket portions. At the top, a scalloped top is provided which covers each of the cylinders. An assembly rod is provided with an integral hook at the top and extends through a central opening in the top through the space formed by the grouping of the cylinders. The rod is pushed down until the hook engages the top. The bottom of the rod extends through the bottom into a recessed central portion where it is engaged by a threaded nut, tightening the nut ties the assembly together. A squirrel shield may extend over the top and have a short central rod which is provided with integral hook portions at the top and bottom. The hook at the top of the rod is suspended from the hook at the bottom of the squirrel shield, and the hook at the top of the squirrel shield serves to suspend the entire unit. Two of the cylinders are adapted to dispense bird seed and the last one is adapted to dispense thistle. Each cylinder is provided with three perches formed by wooden rods extending through each cylinder and projecting outwardly from an opposite side. The perches are staggered around the cylinders out of vertical alignment with each other. The thistle dispenser is provided with a small opening above each perch. The bird seed dispenser is provided with a large opening having a baffle member to prevent the seed from spilling out.

7 Claims, 8 Drawing Figures

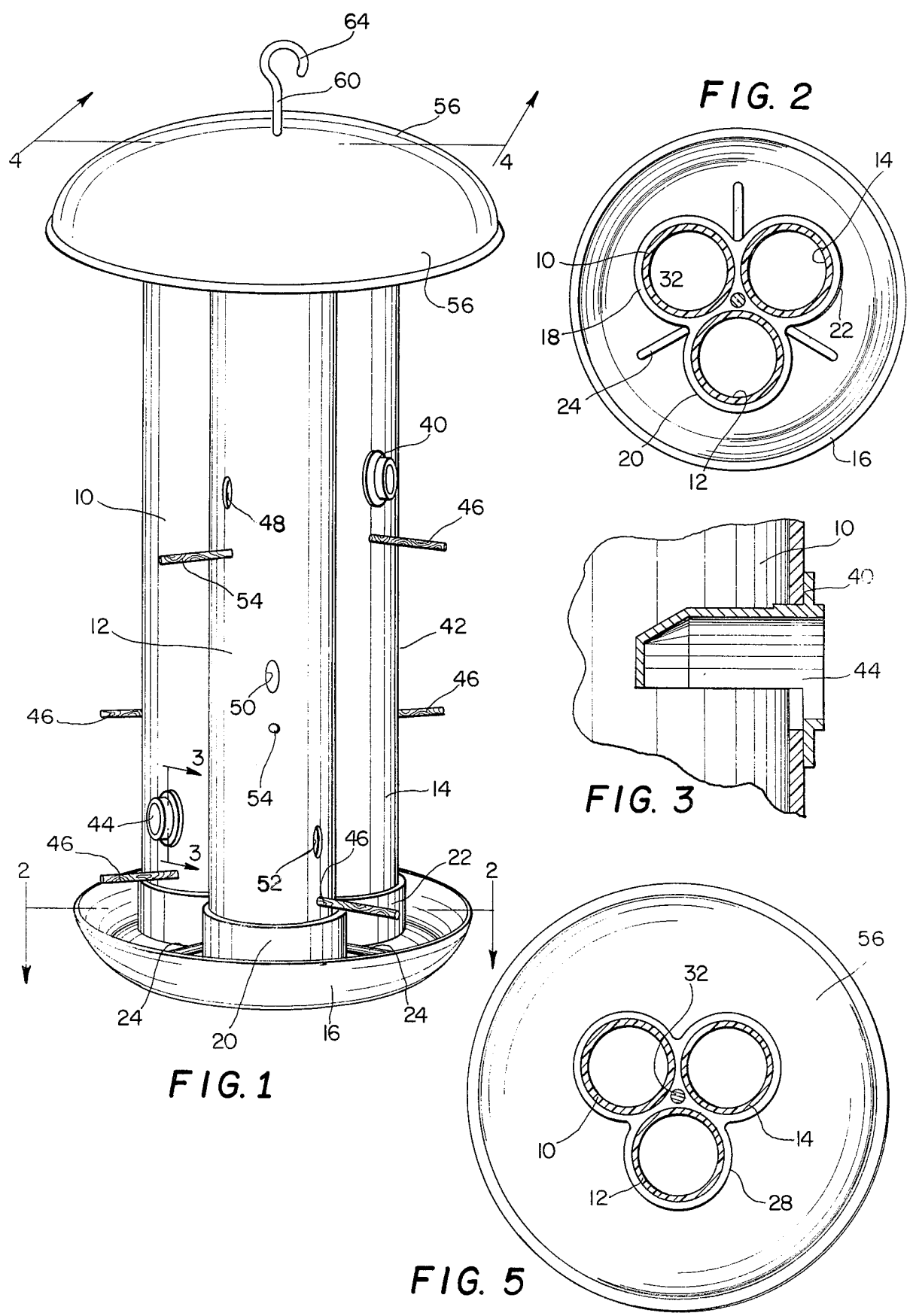

MULTIPLE BIRD FEEDER

BACKGROUND OF THE INVENTION

Bird feeders come in various types, styles and sizes. Most are comparatively small and require frequent filling. The larger ones are single elongated cylinders holding a single type of bird feed. If it is desired to dispense a more varied type of feed, several feeders must be used. The most popular feeders using the bird seed usually do require frequent filling. When the feeders are not attended to, they run out of feed and hang uselessly.

SUMMARY OF THE INVENTION

The present invention is designed to provide a multiple bird feeder which holds much more than the small single feeders, and which is designed to hold at least two different types of bird feed. The feeder comprises three elongated hollow cylinders of clear transparent plastic material. The cylinders are grouped together in contiguous relation and held in this position at the top and bottom. The bottom comprises an annular dished member having three socket portions into which the bottom ends of the cylinders are set. The top is scalloped to extend around the three tops and cover the cylinders. An assembly rod extends through the top, into the central space between the cylinders, and down through the bottom. At the top, the rod is provided with an integral hook for suspending the feeder. At the bottom, a threaded nut tightens the assembly together. A quirrel shield may be used having a central vertical rod. The top is provided with a suspension hook for the unit. The bottom is provided with a hook for receiving the top hook of the feeder rod. Two of the cylinders are adapted to dispense a bird seed, or two different types of bird seed. The third cylinder is adapted to dispense thistle for the smaller birds. Each cylinder is provided with three perches formed by wooden rods extending through the cylinders. The perches are staggered around the cylinder in spaced vertical relation so that they are out of vertical alignment. The thistle dispenser is provided with a small opening above each perch. The seed dispensers are provided with a large opening above each perch in which a baffle member is mounted to prevent spilling and proper feeding of the seeds.

DESCRIPTION OF THE DRAWINGS

In the drawings:

FIG. 1 is a perspective view of a multiple bird feeder embodying my present invention;

FIG. 2 is a section taken on line 2—2 on FIG. 1;

FIG. 3 is a fragmentary enlarged section taken on line 3—3 on FIG. 1;

FIG. 5 is a section taken on line 5—5 on FIG. 4;

DESCRIPTION OF THE INVENTION

Figure 4:
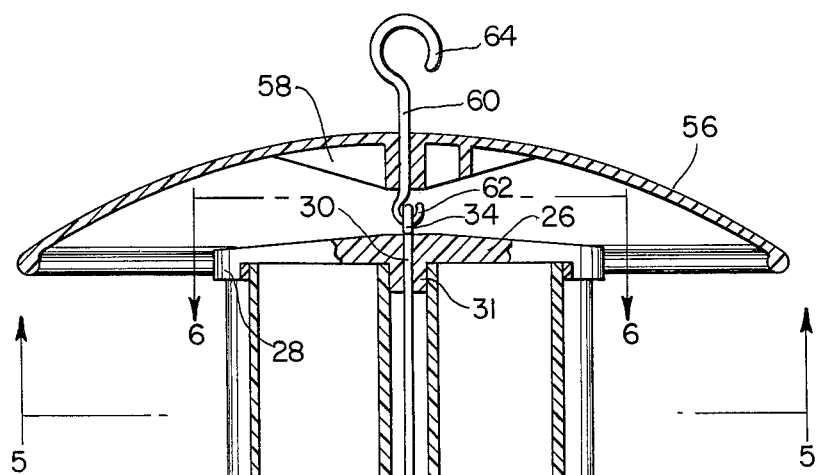
FIG. 4 is a section taken on line 4—4 on FIG. 1.

Referring more in detail to the drawings, the multiple feeder of the present invention comprises three elongated, hollow, cylindrical members 10, 12 and 14. It is preferred that the members 10, 12 and 14 be of a clear, rigid, transparent, plastic material. As can be seen in FIG. 1, the members 10, 12 and 14 are grouped in contiguous relation and held in position by the assembly at the top and bottom.

The bottom 16 is dished to act as a catcher for loose bird seed dropping from above. The central inner portion is provided with three integral sockets 18, 20 and 22 grouped so that the bottom ends of the members will set into the sockets, the member 10 into the socket 18, the member 12 into the socket 20, and the member 14 into the socket 22. The bottom 16 may also be provided with stiffening and strengthening ribs 24 extending from the socket portions, FIG. 2.

Figure 6:
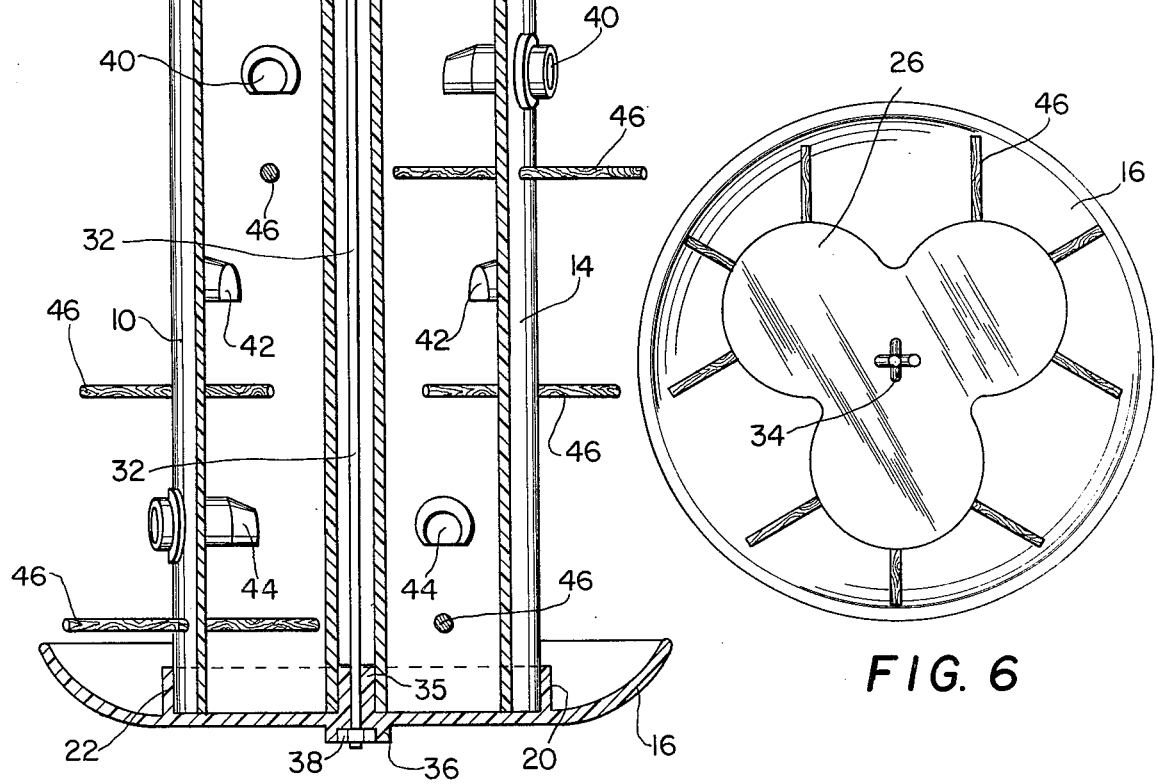
FIG. 6 is a section taken on line 6—6 on FIG. 4.
Figure 7:
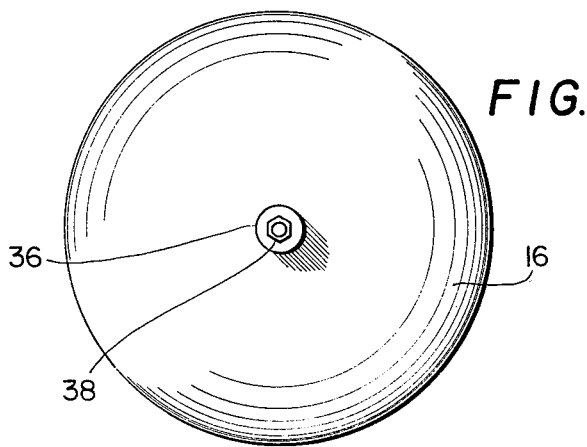
FIG. 7 is a bottom plan view of the feeder.
Figure 8:
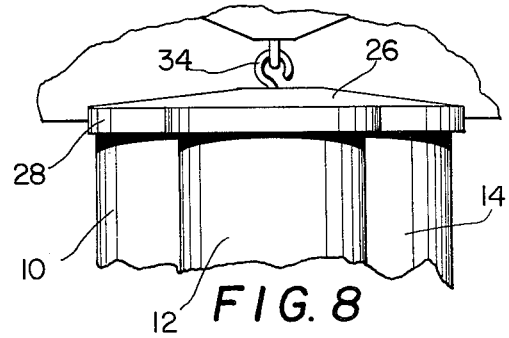
FIG. 8 is a fragmentary side elevation of the top portion of the feeder.

At the top, I provide a top 26, see FIGS. 4 and 6, having a scalloped edge to snugly fit over the tops of the cylinders, 10, 12 and 14. The top 26 is provided with a peripheral flange 28 which embraces the top edges of the cylinders. The top 26 is also provided with a central opening 30 extending vertically therethrough. The top is also provided with a downwardly extending central boss member 31 (See FIG. 4) through which the opening 30 also extends. The boss 31 is of a sufficient vertical extent to provide rigidity and in turn may also be adapted to contact contiguous portions of the grouped cylinders 10, 12 and 14 and thus may accomplish the added function of more positively positioning the cylinders. The cylinders also create a somewhat triangular space or channel 33, vertically extending between the top and bottom of the feeder.

To lock the assembly together, I provide an assembly rod 32 which extends vertically through the central space 33 among the grouped cylinders, FIG. 4. The top of the rod 32 is provided with an integral hook 34. The bottom end of the rod 32 is threaded and extends through a central boss member 35 of the bottom 16, the bottom 16 and thence into a bottom recess 36 in the bottom 16 where it is engaged by the threaded nut 38. Thus, tightening the nut 38 draws the rod hook 34 down onto the top 26 and pushes the bottom 16 upwardly to lock the cylinders 10, 12 and 14 into the position shown in FIG. 1. The member 35 may also contact the cylinder walls and thus additionally facilitate more positive positioning of the cylinders 10, 12 and 14 in the manner referred to above with regard to member 31.

Now referring to FIG. 1, the cylinders 10 and 14 are designed to dispense bird seed for the larger birds while the cylinder 12 is designed to dispense thistle for the smaller birds. The cylinders 10 and 14 are thus each provided with staggered openings 40, 42 and 44 which are staggered around the cylinder to position the openings out of vertical alignment. The openings 40, 42 and 44 each has a baffle extending into the cylinder, the baffles having flanges glued to the outer surface of the cylinders. A wooden peg 46 extends into each cylinder just below the baffles and openings to form perches for the birds. The pegs can extend through to the opposite side and into appropriate openings in the cylinders.

The cylinder 12, which holds the thistle, is provided with small staggered openings 48, 50 and 52 with a perch 54 under each opening. While the entire assembly can be suspended from the hook 34, a squirrel guard can be easily added, as shown in FIGS. 1 and 4. The squirrel guard 56 is a large umbrella shaped member having stiffening ribs 58 under the central portion. A central vertical opening extends through the guard and a suspension rod 60 is positioned in the opening. The lower end of the rod 60 is provided with an integral hook 62 and the upper end is provided with an integral hook 64.

The lower hooked end 62 is small and adapted to engage the hook 34 at the top of the rod 32. The upper hook 64 is much larger and adapted to support the entire assembly. When the squirrel guard 56 is being used, the feeder is suspended from the hook 62 of the guard, and both are suspended by the hook 64. It should be noted that when the guard is being used, the top 26 may be left open above each cylinder for easy filling, that is, may be web-like with the upper panel or surface open above each cylinder.

The feeder of the present invention is thus actually simple in construction and easy and economical to assemble. It provides for two or more different types of bird feeds. Note that the cylinders 10 and 14 can also have different types of bird seed, so that there are three different types of feed.

Other advantages of the present invention will be readily apparent to a person skilled in the art.

I claim:

1. A bird feeder adapted to simultaneously and separately store and dispense a variety of feed materials comprising a plurality of separate hollow cylindrical members grouped together in contiguous relation and forming a hollow vertically oriented channel centrally therebetween, said hollow members adapted to receive feed and in turn provided with means including openings in the body of said cylinders whereby said feed may be dispensed therefrom, a bottom member adapted to receive the bottom portions of said cylindrical members and in turn provided with an upstanding boss member aligned with said bottom member extending peripherally beyond the extent of said cylindrical members and defining a concave tray adapted to receive feed spilled from said cylindrical members and projecting into said channel, a top member adapted to receive the top portions of said cylindrical members and in turn provided with a downwardly extending boss member aligned with and projecting into said channel, said boss members each having a bore, and a rod adapted to pass through channel and said bores and extend outwardly from said boss members, said end including locking means to urge said top and bottom members against said cylindrical members.

2. A bird feeder as in claim 1, wherein there are three cylindrical members, two of said members being adapted to feed bird seed for large birds and one of said cylindrical members being adapted to feed thistle for smaller birds.

3. A bird feeder as in claim 2, wherein said bottom member is dish-shaped and is provided with three central integral socket portions, the bottoms of said cylindrical members setting into said socket portions.

4. A bird feeder as in claim 1, wherein said top member has a scalloped perimeter to extend closely around the tops of said cylindrical members, and a vertical flange extending down from said perimeter to encompass said cylindrical members.

5. A bird feeder as in claim 3, wherein said top member has a scalloped perimeter to extend closely around the tops of said cylindrical members, and a vertical flange extending down from said perimeter to encompass said cylindrical members.

6. A bird feeder as in claim 1 or 5, wherein said locking means comprises an enlarged hook for suspending said device on the top of said rod and engaging said top member, the bottom of said rod having a threaded nut for securing said rod against the bottom of said bottom member.

7. A bird feeder as in claim 6, wherein an umbrella shaped squirrel guard is added to said bird feeder, said squirrel guard having a central opening, a rod extending vertically through said opening, the top of said rod having an integral hook for suspending said squirrel guard and said bird feeder, the bottom of said rod having an integral hook adapted to engage the hook at the top of said feeder rod for suspending said bird feeder.

* * * * *